UNITED STATES PATENT OFFICE.

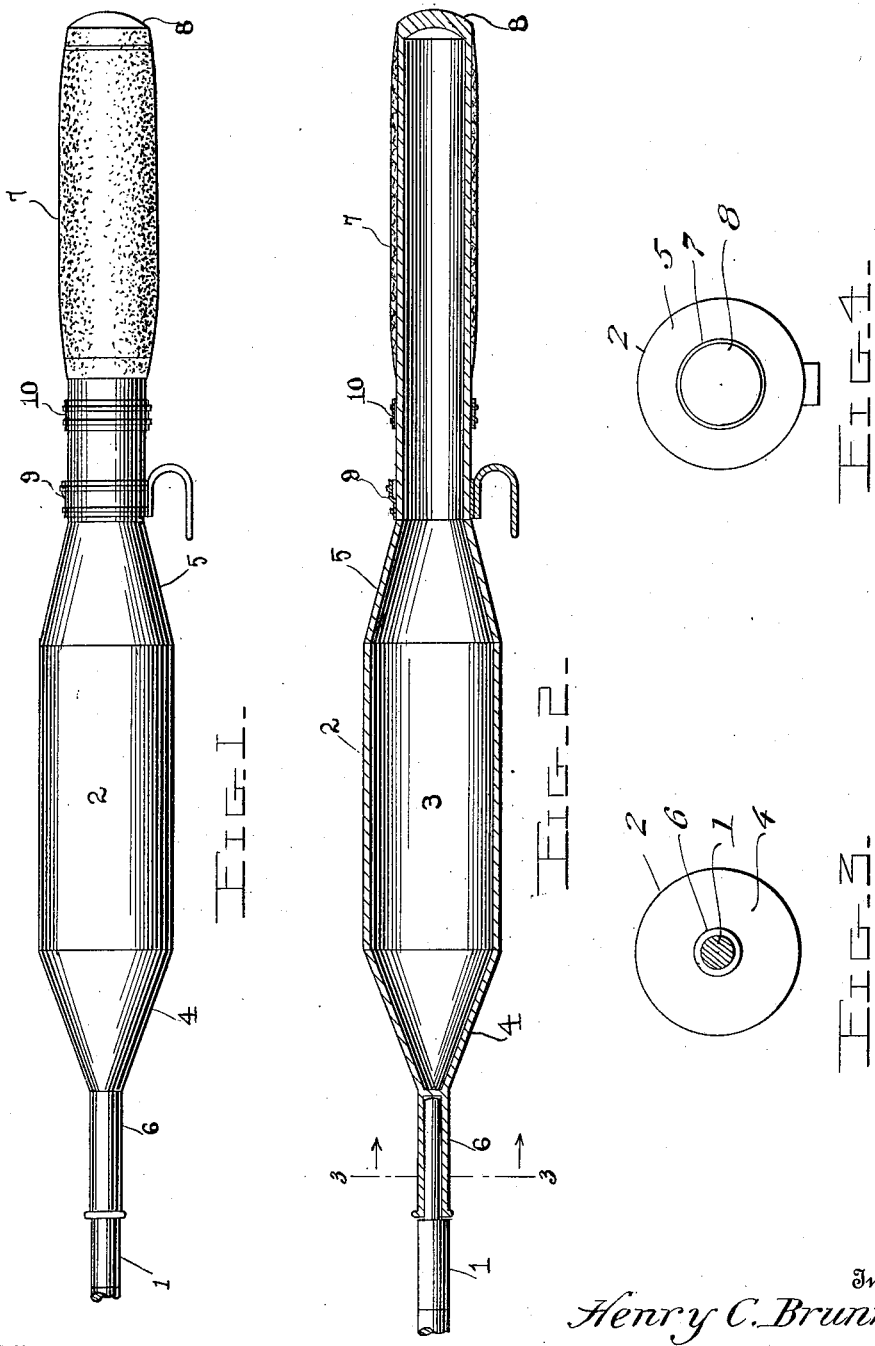

HENRY C. BRUNNETT, OF UTICA, NEW YORK.

FISHING-ROD HANDLE.

1,033,668.	Specification of Letters Patent.	Patented July 23, 1912.

Application filed July 8, 1911. Serial No. 637,480.

*To all whom it may concern:*

Be it known that I, HENRY C. BRUNNETT, a citizen of the United States, residing at Utica, in the county of Oneida and State of New York, have invented new and useful Improvements in Fishing-Rod Handles, of which the following is a specification.

This invention relates to handles for fishing rods, the object of the invention being to provide a simple, light and convenient form of handle which provides an air chamber, whereby the handle is adapted to perform the function of a float to prevent the rod from sinking if it should accidentally fall into the water.

The invention consists of the features of construction, combination and arrangement of parts, hereinafter fully described and claimed, reference being had to the accompanying drawings, in which:—

Figure 1 is a side elevation of a portion of a fishing rod provided with my improved handle. Fig. 2 is a longitudinal section through the handle on an enlarged scale. Fig. 3 is a vertical transverse section through the handle on line 3—3 of Fig. 2. Fig. 4 is a rear elevation of the handle.

Referring to the drawing, 1 designates a rod, constructed of any suitable material, and 2 the improved handle embodying my invention.

The handle 2 comprises a hollow body having a substantially cylindrical main portion 3 provided with tapering or frusto-conical ends 4 and 5, the forward end 4 terminating in a reduced cylindrical extension 6 to receive the butt end of the rod, which may be secured thereto in any suitable manner so as to form an air and water-tight connection. From the end 4 of the body projects a cylindrical extension 7, forming the grip of the handle, which extension communicates at its forward end with the hollow body, and is closed at its outer or rear end 8, as shown. The grip 8 is provided with the usual fixed and sliding reel clamping devices 9 and 10.

It will be observed from the foregoing description that the body 3 forms an air chamber which is light in weight but of sufficient air containing capacity to serve as a float, to prevent the rod from sinking in case it should fall into the water. The conical ends 4 and 5 reduce the capacity of the float to the desired degree and provide for proper projection of the tubular extension 6 and the grip 7 therefrom. The grip 7 is hollow and communicates with the body 3, and is also adapted to contain air, thus lightening the weight of the handle as a whole, and at the same time increasing the buoying capacity of said handle.

The handle may be made of different sizes for attachment to rods of different lengths and weights, as will be readily understood.

Having thus described the invention, what I claim as new, is:—

A handle for fishing rods comprising a hollow cylindrical air-containing body forming a float, said body having frusto-conical ends terminating in reduced cylindrical or tubular extensions, one of said extensions being closed at its inner end against communication with the body and forming a socket to receive the butt end of the rod, and the other cylindrical extension forming a grip closed at its outer end and communicating at its inner end with the body and constituting a prolongation of the air-containing space.

In testimony whereof I affix my signature in presence of two witnesses.

HENRY C. BRUNNETT.

Witnesses:
W. R. JONES,
L. D. FOWLER.

---

Copies of this patent may be obtained for five cents each, by addressing the "Commissioner of Patents, Washington, D. C."